(No Model.)

J. D. COX.
PROCESS OF MAKING BREAD.

No. 365,331.  Patented June 21, 1887.

Witnesses:
John Connell
Valentine Bengler

Inventor:
Joseph D. Cox

UNITED STATES PATENT OFFICE.

JOSEPH D. COX, OF ROCHESTER, NEW YORK, ASSIGNOR TO MARY E. COX, OF SAME PLACE.

PROCESS OF MAKING BREAD.

SPECIFICATION forming part of Letters Patent No. 365,331, dated June 21, 1887.

Application filed June 28, 1886. Serial No. 206,302. (No model.)

*To all whom it may concern:*

Be it known that I, JOSEPH D. COX, of the city of Rochester, in the county of Monroe and State of New York, have invented a certain new and useful Process for the Making of Bread; and I hereby declare the following to be a full, clear, and exact description of the same, reference being had to the accompanying drawings, in which—

Figure 1:
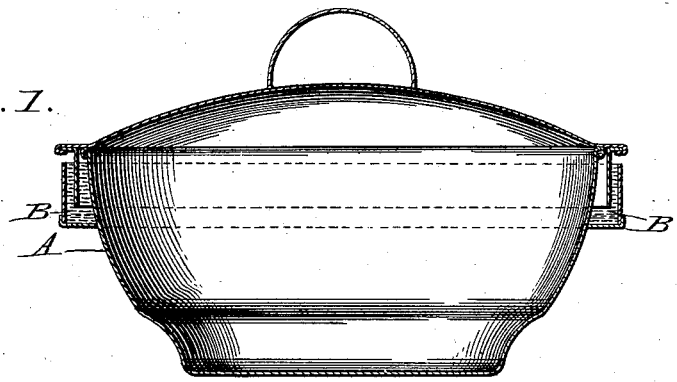
Figure 2:
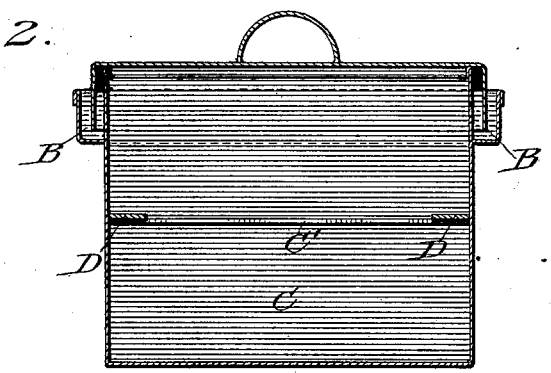
Figure 3:
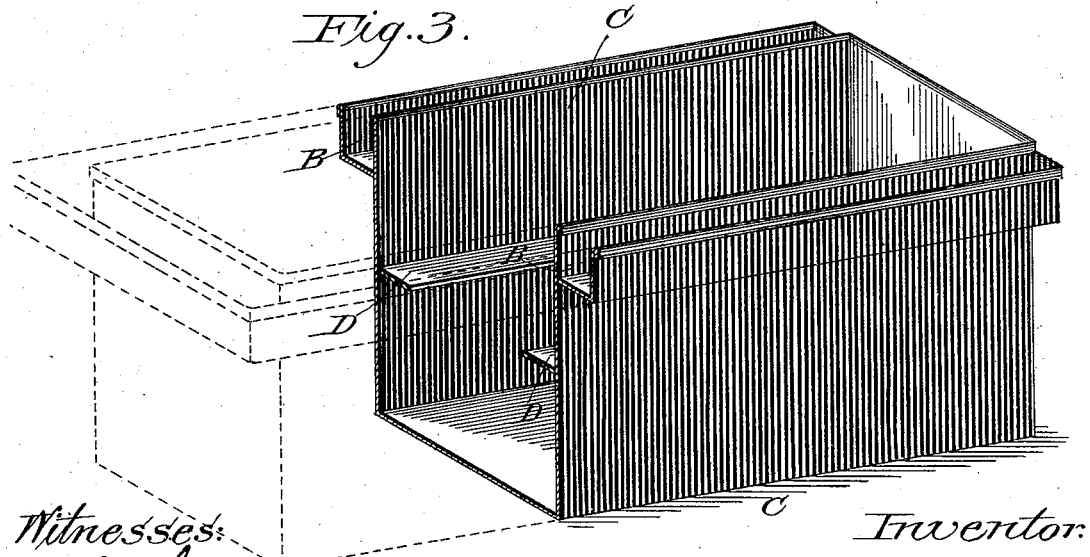

Figure 1 is a central vertical section of the mixing and raising vessel. Fig. 2 is a vertical cross-section of the vessel for the second raising; and Fig. 3 is a perspective view of the same, partly in section.

My invention pertains more particularly to the setting and raising of batter or dough previous to the baking of the same, and has for its objects the keeping of the said batter or dough protected from currents of air, the keeping of the surface of the dough in a moist viscous condition, and the retention of the heat of fermentation, which in the common methods of bread-making is allowed to escape from the upper or exposed surface of the batter, thus retarding the proper raising of the exposed portion of the dough, and so conducing to the formation of a tough hard upper crust.

As is well-known to physicists, the acrid and bad-smelling gases and vapors accompanying carbonic acid and alcohol generated by fermentation, and which are soluble in water, much more easily pass through and escape from colloid substances like dough when the outer surface is moist or wet than when it is dry.

The retention of the surface of the batter in a moist condition is one of the objects of my invention, as it permits the ready volatilization and escape of certain vapors injurious to the taste of the bread.

For carrying out my process, the mixing-pan A is provided with a cover at some height above the contents of the pan, the down projecting rim of which cover sits into an annular channel or trough, B B, of the pan, as shown in Fig. 1. This annular channel may be filled with water or other liquid, thus preventing the inward passage of air, but permitting the excape through the water of gases and vapors generated and expanded by the fermentation and heat within. The batter or dough is mixed in this vessel A and allowed to stand therein the usual time in a warm place to rise, and after having received its first rising is made up in loaves and placed in pans or tins, which are then placed in the second vessel, C, to complete the rising. This box or receptacle C, Figs. 2 and 3, in which the rising of the bread is finished, is also provided with an air-tight cover, the down-projecting edge of which sets into a water channel or seal around the top edge of the box or receptacle, as does the cover of the mixing-pan. The receptacle C is also provided with movable cross-bars or supports D D, the ends of which rest on the narrow horizontally-projecting edges C' C', thus permitting the placing of two tiers of pans within the box C. The length of time which the dough is left in the two vessels varies according to temperature; but the periods are about the same as those ordinarily employed. For instance, for family use the dough is left in the mixing-pan over night in a warm place, and in the morning is taken out, made up in loaves, and placed for an hour or two in the vessel C in a warm place for the completion of the rising, after which the bread is baked.

In defining my invention with greater clearness, I would state that I am aware that dough has been raised for making bread by placing it in an inclosed chest in which a hot brick was suspended, as shown in Patent No. 181,989. My process differs from this, in that the dough is hermetically sealed by the water-trough, and while the gases may escape by passing through and being dissolved in the water, no air can get in, and the surface of the dough is kept moist and in a condition which at once facilitates the escape of gases and prevents the formation of a thick and undesirable crust. Bread made in this way is more palatable and digestible by reason of the more perfect elimination of the gases, will keep fresh longer by reason of its retention of the necessary proportion of water while rising, and even when stale can, in view of its thin crust, be restored to freshness by heating without drying the loaf to an undesirable state of desiccation.

Having thus described my invention, what I claim as new is—

The process herein described of preventing the formation of a thick crust and facilitating the rising and elimination of gases from bread-dough, which consists in fermenting said dough in a chamber hermetically closed by a liquid seal, substantially as and for the purpose described.

JOSEPH D. COX.

Witnesses:
WM. BUTLER CRITTENDEN,
JOHN A. ALLISON.